UNITED STATES PATENT OFFICE.

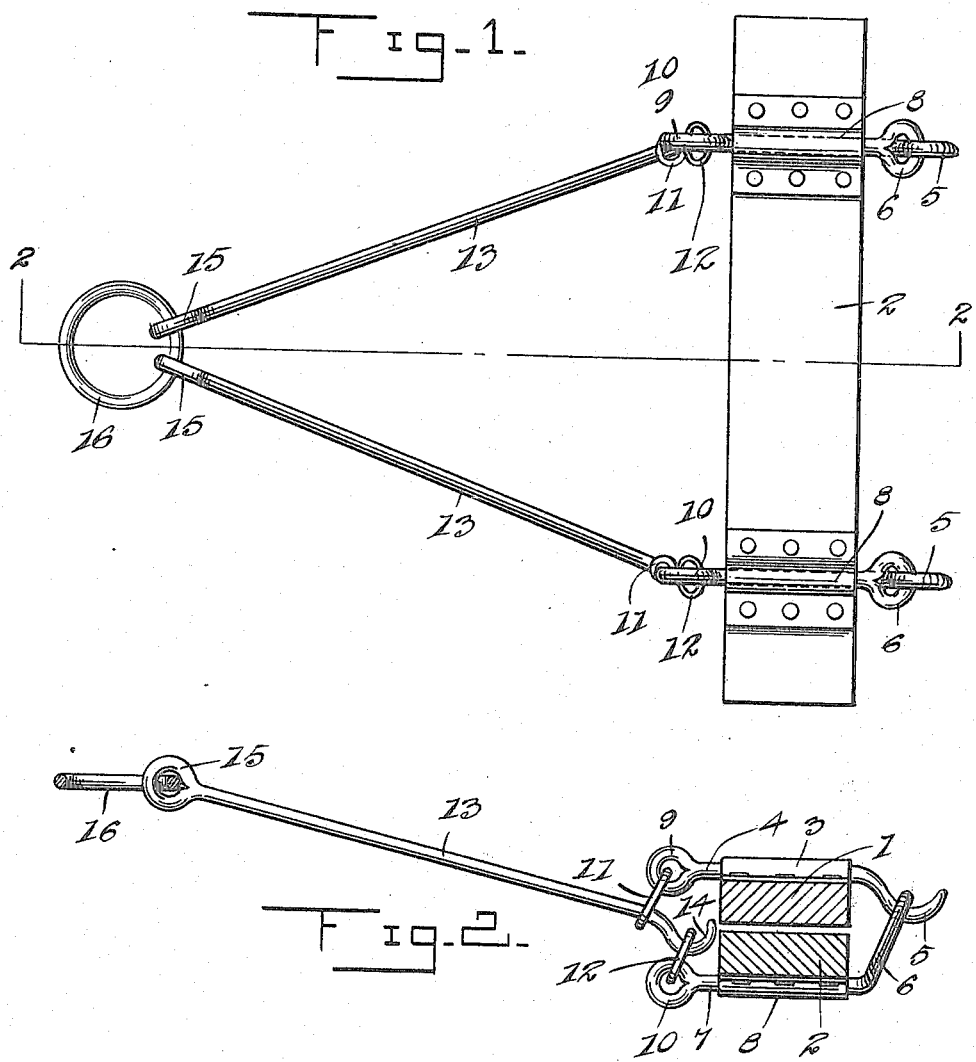

DRURY E. STEVENS, OF PLEASANT HILL, LOUISIANA.

WIRE-FENCE CLAMP.

1,133,192.  Specification of Letters Patent.  Patented Mar. 23, 1915.

Application filed April 24, 1914. Serial No. 834,268.

*To all whom it may concern:*

Be it known that I, DRURY E. STEVENS, a citizen of the United States, residing at Pleasant Hill, in the parish of Sabine and State of Louisiana, have invented certain new and useful Improvements in Wire-Fence Clamps, of which the following is a specification.

This invention relates to woven wire fence clamps, designed to be used with a stretcher of any suitable character, and one of the principal objects of the invention is to provide a clamp of simple construction which can be quickly operated and which will be reliable and efficient in holding the wire fence against slipping.

Another object of the invention is to provide a wire fence clamp in which the clamping members are forced together by the pull of the stretcher, and which will hold the wire fence more firmly when greater force is applied to the stretcher. In other words, the clamp will engage the wires of the fence with more or less friction depending upon the power applied to the stretcher.

These and other objects may be attained by means of the construction illustrated in the accompanying drawing, in which, Figure 1 is a side elevation of a wire clamp made in accordance with this invention, and Fig. 2 is a sectional view taken on the line 2—2 of Fig. 1.

Referring to the drawing, the numerals 1 and 2 designate the clamping members and these members may be formed of good strong wood or other material and may be provided with face plates if desired. Connected to the member 1 by means of suitable keeper plates 3 are hooks forming one member of a hinged joint which can be readily detached whenever desired. The hooks are each provided with a shank 4 which extends through the keeper plate 3 and the latter is securely bolted to the member 1. Projecting from the shank 4 at one side of the member 1 is an obtuse hook 5. The hook members 5 are spaced apart as shown in Fig. 1 and each hook is adapted to engage an eye 6 which extends at an angle to the member 2 and is secured to said member by means of a shank 7 extending through a keeper plate 8. The hook members and the eye members are secured at the same distance apart upon the members 1 and 2 so that the hooks 5 will engage the eye 6 and form a hinged joint so that the two members may be readily separated when desired. Formed upon the ends of the shanks 4 and 7 are eyes 9 and 10. Movably connected in the eye 9 is a link 11, and similarly connected to the eye 10 is a link 12.

The stretcher lever which serves to close the two members of the clamp each comprises a rod or shank 13 having an offset hook 14 at the inner end thereof, said hook adapted to engage the link 12 while the shank 13 is passed through the link 11, as shown more clearly in Fig. 2. The two levers 13 are each provided with an eye 15 which engages a ring 16, and a stretcher of any suitable construction may engage the ring 16.

From the foregoing it will be obvious that when a fence wire fabric is engaged between the members 1 and 2 of the clamp and the shanks 13 are passed through the links 11 and the hook 14 is engaged with the link 12. A pull upon the ring 16 will close the jaw members of the clamp together with great force depending upon the amount of power applied by the stretcher, since the shank 13 draws upon one link inwardly and upon the other link 12 inwardly to close the jaw members of the clamp and the greater the power of pull upon the stretcher the greater force will be exerted in closing the members 1 and 2.

The invention is simple in construction, is reliable in operation, cannot readily get out of order and will hold a fence wire fabric firmly and prevent slipping, and will force the clamp members together with more or less power depending upon the power of the stretching mechanism.

Various changes in the details of construction may be resorted to without departing from the spirit and scope of the invention as defined in the claim.

What is claimed is:—

A wire fence clamp comprising two bars, each having a keeper plate secured near the opposite ends thereof, hinge members clamped to said bars by said keeper plates, said hinge members on one of said bars comprising shanks extending under the keeper plate, and hooks on the outer ends of said shanks and eyes on the inner ends thereof, the hinge members on the other clamp member having loops to engage said hooks at one end, said loops being off-set from the plane of the shank thereof, and said shanks each having an eye at its opposite end upon opposite sides of the bars from said loops, links secured to the eyes, and levers, each having a hooked end extending through said links and connected at their outer ends by means of a ring.

In testimony whereof I affix my signature in presence of two witnesses.

DRURY E. STEVENS.

Witnesses:
H. FOGLE,
BRUCE HAMMOND.